(12) United States Patent
Nagata et al.

(10) Patent No.: US 7,357,871 B2
(45) Date of Patent: Apr. 15, 2008

(54) METHOD FOR EVALUATING CATION-EXCHANGE RESIN AND METHOD FOR CONTROLLING WATER TREATMENT SYSTEM USING THE SAME

(75) Inventors: Yusuke Nagata, Tokyo (JP); Shinichi Ohashi, Tokyo (JP)

(73) Assignee: Organo Corporation, Tokyo (JP)

( * ) Notice: Subject to any disclaimer, the term of this patent is extended or adjusted under 35 U.S.C. 154(b) by 471 days.

(21) Appl. No.: 10/520,233

(22) PCT Filed: May 12, 2003

(86) PCT No.: PCT/JP03/05889

§ 371 (c)(1),
(2), (4) Date: Jan. 4, 2005

(87) PCT Pub. No.: WO2004/008134

PCT Pub. Date: Jan. 22, 2004

(65) Prior Publication Data

US 2006/0032818 A1 Feb. 16, 2006

(30) Foreign Application Priority Data

Jul. 11, 2002 (JP) .............................. 2002-202634

(51) Int. Cl.
*B01D 15/04* (2006.01)

(52) U.S. Cl. ..................... 210/662; 210/683; 210/686

(58) Field of Classification Search ................ 210/662, 210/681, 683, 685, 686
See application file for complete search history.

(56) References Cited

FOREIGN PATENT DOCUMENTS

| | | |
|---|---|---|
| JP | 7-159587 | 6/1995 |
| JP | 9-210977 | 8/1997 |
| JP | 9-257778 | 10/1997 |
| JP | 10-2890 | 1/1998 |
| JP | 10-282082 | 10/1998 |
| JP | 2001-228134 A * | 8/2001 |

* cited by examiner

*Primary Examiner*—Matthew O. Savage
(74) *Attorney, Agent, or Firm*—Norris McLaughlin & Marcus PA

(57) ABSTRACT

A method for a cation-exchange resin wherein a strongly acidic cation-exchange resin is contacted with an aqueous eluting solution and the polystyrenesulfonic acid being eluted from this resin is measured, which comprises setting a plurality of molecular weight ranges in the molecular weight distribution of the polystyrenesulfonic acid eluted, and evaluating the performance capability of the cation-exchange resin based on the correspondence relationship of each molecular weight range with the amount eluted in said each molecular weight range. The evaluation method allows on-target and precise evaluation of the performance capability of a cation-exchange resin being independent of the structure of a base resin and the circumstance under which it is used, which leads to the determination of the optimum time for the exchange of a resin in a water treatment system using a cation-exchange resin, and thus to the extension of exchange of a resin and the reduction of an operation cost for the system.

13 Claims, 4 Drawing Sheets

METHOD FOR EVALUATING CATION-EXCHANGE RESIN AND METHOD FOR CONTROLLING WATER TREATMENT SYSTEM USING THE SAME

TECHNICAL FIELD OF THE INVENTION

The present invention relates to a method for evaluating a cation-exchange resin and a method for controlling a water treatment system using the same, and more specifically, to a method for determining a deterioration degree of a strongly acidic cation-exchange resin used in a condensate demineralizer of a power plant such as a fossil-fueled electric power plant and a pressurized water reactor-type nuclear power plant (hereinafter, also referred to as "PWR-type nuclear power plant"), and a method for controlling a water treatment system using the same.

BACKGROUND ART OF THE INVENTION

A strongly acidic cation-exchange resin, which is combined with a strongly basic anion-exchange resin to form a mixed bed and used in a condensate demineralizer of a fossil-fueled electric power plant or a PWR-type nuclear power plant, is usually a cation-exchange resin containing sulfonic acid groups as exchange groups, and the main constituent of substances eluted from the resin is polystyrenesulfonic acid (hereinafter, also referred to as "PSS"). It is known that, in a case where a strongly acidic cation-exchange resin has been degraded by oxygen, PSS is eluted, the eluted PSS fouls the anion-exchange resin, and the demineralization performance of the anion-exchange resin deteriorates. Moreover, when the degradation of the demineralization performance progresses, impurity substance ions leak at an exit of the demineralizer, and a degree of purity necessary for treated water cannot be ensured.

Therefore, it becomes necessary to adequately evaluate an ongoing performance of such a cation-exchange resin used in a condensate demineralizer and always to use a resin which has not degraded to an unacceptable degree. As a common method for evaluating the performance of a cation-exchange resin is to determine the PSS elution tendency. In practice, a method is employed wherein a strongly acidic cation-exchange resin is dipped or agitated in an aqueous extracting solution and after a predetermined time an amount of PSS eluted into the aqueous extracting solution is determined (for example, JP-A-9-210977). In this method, an amount of eluted PSS having a molecular weight of 10,000 or more, for example, is employed as an index of deterioration.

However, from recent investigation results, it has been recognized that, depending upon the nature of the structure of the matrix of a strongly acidic cation-exchange resin and the circumstance under which it is used, there is a case where a proper evaluation cannot be achieved by the conventional method for merely determining the amount of PSS elution. For even if the same category of strongly acidic cation-exchange resins are used, for example, there is a difference in distribution of molecular weight of eluted PSS between a gel-type strongly acidic cation-exchange resin and a porous-type strongly acidic cation-exchange resin, and when the distribution of molecular weight of eluted PSS is different between these resins, the degree of influence upon the PSS reaction to a strongly basic anion-exchange resin varies too.

DISCLOSURE OF THE INVENTION

Accordingly, an object of the present invention is to provide a method capable of more precisely achieving evaluation of a performance of a cation-exchange resin independently of the structure of the resin matrix and the circumstance under which the resin is used, and a method for controlling a water treatment system using the same.

To accomplish the above object, a method for evaluating a cation-exchange resin according to the present invention wherein the strongly acidic cation-exchange resin is contacted with an aqueous eluting solution and polystyrenesulfonic acid being eluted from the resin is measured, comprises the steps of setting a plurality of molecular weight ranges in a molecular weight distribution of the polystyrenesulfonic acid eluted; and evaluating a performance of the strongly acidic cation-exchange resin based on a relationship of each molecular weight range with an amount eluted in said each molecular weight range. Namely, merely the total amount of PSS eluted is not paid attention to, but this method is a new evaluation method for paying attention to an elution amount in each molecular weight range.

Especially, in this method, it is preferred that a weighting factor for indicating a degree concerning the performance of the strongly acidic cation-exchange resin is preset for said each molecular weight range, and the performance of the strongly acidic cation-exchange resin is evaluated by using the sum of values, each calculated by multiplying an amount of PSS eluted in said each molecular weight range by a corresponding weighting factor, as an index indicating the performance of the strongly acidic cation-exchange resin. By using such a sum as the index, it becomes possible to determine the resin performance only by this sum.

The above-described weighting factor can be set by various methods. For example, the weighting factor can be preset for said each molecular weight range, based on a variation degree of a property of a strongly basic anion-exchange resin ascribed to PSS eluted from the strongly acidic cation-exchange resin when this resin is used in a form of a mixed bed with an anion-exchange resin. More specifically, for example, the weighting factor for said each molecular weight range can be set based on a variation degree of a property of an anion-exchange resin exhibited when a representative molecular weight (a median value or so) is set for said each molecular weight range and a standard PSS having the representative molecular weight as a known molecular weight is adsorbed on the anion-exchange resin. In this case, as the property of the anion-exchange resin for observing the variation degree, a mass transfer coefficient (hereinafter, also referred to as "MTC") of the anion-exchange resin can be employed, and further, the weighting factor can also be set based on a variation degree of a demineralization performance of the anion-exchange resin.

As the above-described molecular weight range of PSS, it is preferred that a plurality of molecular weight ranges are set in a broader range of molecular weight of 10,000 or more. Because a PSS having a molecular weight less than 10,000 does not contribute little if any to the degradation of the performance of the strongly basic anion-exchange resin, it is possible to eliminate it from the determination factor in the evaluation of the resin performance and even if eliminated, the accuracy of the evaluation of the resin performance according to the present invention is not substantially influenced.

Further, in the method for evaluating a cation-exchange resin according to the present invention, it is possible to evaluate a resin sample by deteriorating the resin sample acceleratedly. For example, it is possible that copper and/or iron ions are adsorbed on the strongly acidic cation-exchange resin, a hydrazine aqueous solution is contacted with the resin to deteriorate it acceleratedly, and after the copper ions and/or the iron ions are desorbed, the hydrazine aqueous eluting solution is contacted to elute PSS acid into the aqueous eluting solution, and the resin sample is evaluated by the above-described method. In this case, for example, an aqueous solution containing ammonia and hydrazine can be used instead of the hydrazine aqueous eluting solution.

The above-described method for evaluating a cation-exchange resin according to the present invention is suitable, in particular, for use in evaluating the performance of a cation-exchange resin used in a condensate demineralizer of a fossil-fueled power plant or a PWR-type nuclear power plant.

In such a method for evaluating a cation-exchange resin according to the present invention, as is evident from the examples described later, independently of the structure of a resin matrix and the circumstance under which the resin is used, as long as the strongly acidic cation-exchange resins have the same resin matrix and exchange groups, it becomes possible to implement precise evaluation of the performance of various resins. In particular, if the aforementioned method for evaluating the resin performance by using the sum of values, each calculated by multiplying an amount of PSS eluted in each molecular weight range by a corresponding weighting factor, is employed, independently of the structure of the resin matrix and the circumstance under which the resin is used, it becomes possible to determine, for example, the deterioration degree or the deterioration tendency of the resin at a high accuracy and at a condition extremely easy to be determined, thereby achieving precise evaluation of the resin performance.

Further, a method for controlling a water treatment system according to the present invention comprises the steps of applying the above-described method for evaluating a cation-exchange resin to an evaluation of the performance of a cation-exchange resin used in a water treatment system; and determining a timing for replacing of the cation-exchange resin based on the result of the evaluation.

Especially, a preferable embodiment of the method for controlling a water treatment system according to the present invention is a method for controlling a water treatment system using the aforementioned method wherein a weighting factor for indicating a degree concerning the performance of the cation-exchange resin is preset for said each molecular weight range of PSS eluted, and the performance of the cation-exchange resin is evaluated by using the sum of values, each calculated by multiplying an amount of PSS eluted in said each molecular weight range by a corresponding weighting factor, as an index indicating the performance of the cation-exchange resin, and determining a timing for replacing the cation-exchange resin. Particularly, a method for controlling a water treatment system is preferred wherein, using the above-described method, an upper limit is set to the sum of values, each calculated by multiplying an amount of PSS eluted in said each molecular weight range by a corresponding weighting factor, and the cation-exchange resin is used in a range of the upper limit or less. In this control method, a method may be employed wherein, with respect to the above-described sum, a criterion value, which is lower than the upper limit, is set for starting to prepare the replacement of the cation-exchange resin being used. By setting such an upper limit or a criterion value, use under the upper limit, which does not run a risk of malfunction of the water treatment system, becomes possible, and it becomes possible to start a preparation for replacing the resin from the time when the criterion value has been reached, and while continuing a stable operation during a term required for the preparation, to perform the replacement of the resin at a timing before reaching the upper limit or at a timing having reached the upper limit. Namely, the cation-exchange resin can be used as long as possible within a term causing no problem in performance, and after the use, the resin can be replaced at an optimum timing.

Such a method for controlling a water treatment system according to the present invention is also suitable to be used for evaluating the performance of a cation-exchange resin used in a condensate demineralizer of a power plant and determining a timing for replacement of the cation-exchange resin based on the result of the evaluation.

In such method for evaluating a cation-exchange resin and method for controlling a water treatment system using the same according to the present invention, it becomes possible to evaluate a deterioration degree of a resin precisely by a single determination method independently of the structure of the resin matrix and the circumstance under which it is used. By employing this evaluation method, it becomes possible to stably continue a desirable operation and use a cation-exchange resin as effectively as possible within a possible term for use, the replacement cycle of the resin may be extended and the cost required for the water treatment operation may be reduced.

THE BEST MODE FOR CARRYING OUT THE INVENTION

Figure 1:
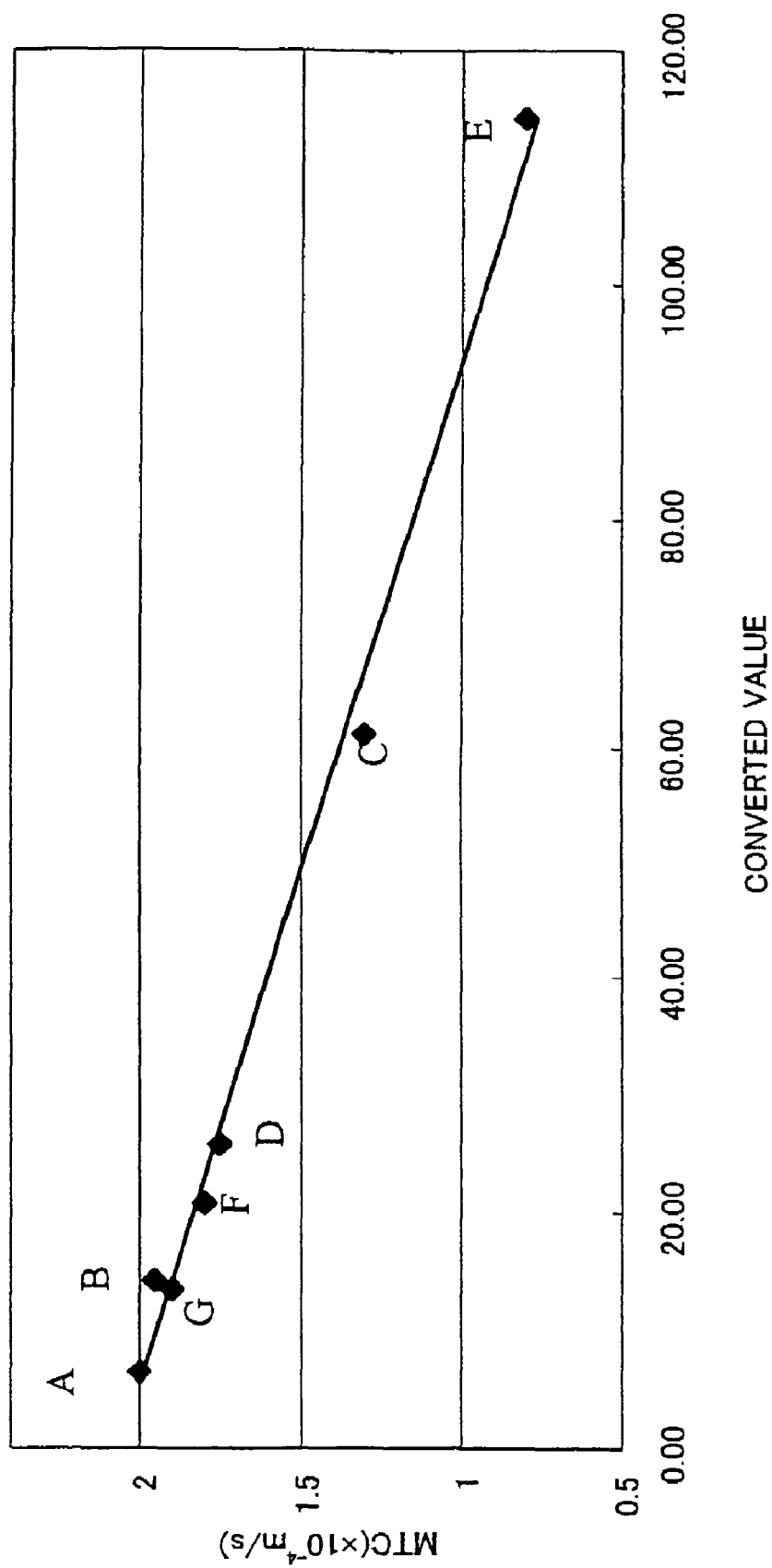
FIG. 1 is a graph showing a relationship between a converted value according to the present invention and MTC (mass transfer coefficient) in examples of the present invention.

Hereinafter, the present invention will be explained based on examples.

First, a plurality of molecular weight ranges were set in a molecular weight distribution of PSS eluted from a cation-exchange resin, and when the performance of a strongly acidic cation-exchange resin is evaluated based on a relationship of each molecular weight range with an amount of PSS eluted in each molecular weight range, a weighting factor for indicating a degree concerning the performance of the strongly acidic cation-exchange resin was set for each molecular weight range as follows.

Table 1 (Tables 1-1 and 1-2) shows a reduction degree of MTC (mass transfer coefficient) for each molecular weight range of a strongly basic anion-exchange resin on which a standard substance of PSS whose molecular weight is known was adsorbed by 100 mg/L relative to one liter of the strongly basic anion-exchange resin (a relationship between a molecular weight distribution of PSS and MTC of the anion-exchange resin). Where, although the MTC of a new strongly basic anion-exchange resin is about $2 \times 10^{-4}$ m/s, the reciprocal of a reduction ratio of each MTC using an MTC relative to PSS with a molecular weight of 10,000 as a base of 1 was calculated, and with respect to a plurality of molecular weight ranges divided into fractions of a molecular weight of 10,000 or more to less than 40,000, a molecular weight of 40,000 or more to less than 150,000, a molecular weight of 150,000 or more to less than 1,000,000, and a molecular weight of 1,000,000 or more, the above-mentioned reciprocal for the median value of each range or a value close thereto was set as a weighting factor (coefficient) for each molecular weight range. Using these weighting factors, the performance of various strongly acidic cation-exchange resins used practically in condensate demineralizers, was evaluated by the method according to the present invention. The statuses of the evaluated sample resins are shown in Table 2 (classification and used years of the sample resins). Samples A to G are all strongly acidic cation-exchange resins which had been variously used in condensate demineralizers of PWR-type nuclear power plants. Among these samples, sample E was incidentally obtained as a sample which had been excessively deteriorated due to usage for an extended period of time.

As to the above-described samples A to G, the performance of the respective strongly acidic cation-exchange resins was determined. Namely, 50 mL of each strongly acidic cation-exchange resin was dipped in an aqueous solution of cupric sulfate ($CuSO_4$), 10 g of Cu was adsorbed per one liter of the resin, the resin bearing Cu ions was dipped in a hydrazine aqueous solution for 16 hours under a condition where 1.5 equivalent of hydrazine relative to one liter of resin existed, to deteriorate the resin acceleratedly. Then, the resin was regenerated by circulating 5% hydrochloric acid aqueous solution through the resin at a rate of 400 g (as a 35% HCL aqueous solution) per one liter of the resin, and the copper ions adsorbed on the resin were desorbed from the resin. This desorption of copper ions followed by elution with eluant hydrazine aqueous solution (see below) prevented the resin from further deteriorating, thereby permitting exactly to determine the accelerated deterioration. After the regenerated strongly acidic cation-exchange resin deprived of copper ions was washed with deionized water, the resin was dipped in 100 mL of an aqueous eluant solution containing ammonia with a concentration of 1% and hydrazine with a concentration of 0.2%, and heated at 40° C. and shaken for 16 hours. After the shaking for 16 hours, the amount of PSS eluted in the aqueous eluant solution was determined by GFC (gel filtration chromatography).

The data obtained for the respective PSS molecular weight ranges were divided into the respective fractions of a molecular weight of 10,000 or more to less than 40,000, a molecular weight of 40,000 or more to less than 150,000, a molecular weight of 150,000 or more to less than 1,000,000, and in the respective fractions, amounts of PSS eluted and the sum thereof were calculated. The results are shown in Table 3 (amount of PSS eluted from sample strongly acidic cation-exchange resin [amount eluted in each molecular weight range and the sum thereof]). Further, the values calculated by multiplying the respective elution amounts of the respective fractions of molecular weight (for the respective molecular weight ranges) by the respective weighting factors shown in Table 1-2 of the respective molecular

TABLE 1-1

Relationship between PSS molecular weight distribution and MTC of anion-exchange resin

| | Molecular weight | | | | |
|---|---|---|---|---|---|
| | 6,500 | 10,000 | 40,000 | 150,000 | 1,000,000 |
| MTC($\times 10^{-4}$ m/s) | 2 | 1.7 | 1.2 | 0.9 | 0.2 |
| Reciprocal✕ | 0.85 | 1 | 1.4 | 1.9 | 8.5 |

MTC of anion-exchange resin when PSS of each molecular weight is adsorbed by 100 mg per one liter of anion-exchange resin
✕:Reciprocal of each MTC ratio on the basis of 1 for a molecular weight of 10,000

TABLE 1-2

| | Molecular weight | | | |
|---|---|---|---|---|
| | 10,000~40,000 | 40,000~150,000 | 150,000~1,000,000 | 1,000,000 or more |
| Coefficient (weighting factor) | 1.2 | 1.65 | 5.2 | 15 |

TABLE 2

Classification of sample resins and Term for use

| | Sample | | | | | | |
|---|---|---|---|---|---|---|---|
| | A | B | C | D | E | F | G |
| Classification | gel-type | gel-type | MR-type | MR-type | MR-type | microporous-type | microporous-type |
| Term for use (year) | 0.4 | 0.7 | 2.7 | 1.2 | 4.2 | 1.2 | 0.5 |
| MTC($\times 10^{-4}$ m/s) | 2 | 1.95 | 1.3 | 1.75 | 0.8 | 1.8 | 1.9 |

All are strongly acidic cation-exchange resins.

weight ranges and the sum thereof are shown in Table 4 (amount 2 of PSS eluted from sample strongly acidic cation-exchange resin).

strongly acidic cation-exchange resins and the sums of elution amounts themselves of PSS having a molecular weight of 10,000 or more. Although samples F and G among

TABLE 3

Amount of PSS eluted from sample strongly acidic cation-exchange resin

| Cation-exchange resin | Molecular weight | | | | |
|---|---|---|---|---|---|
| | 1,000,000 or more; | 150,000 or more less than 1,000,000 | 40,000 or more less than 150,000 | 10,000 or more less than 40,000 | Sum of 10,000 or more |
| A | 0.30 | 0.16 | 0.45 | 0.28 | 1.19 |
| B | 0.63 | 0.33 | 1.09 | 1.08 | 3.13 |
| C | 3.65 | 0.48 | 1.72 | 0.98 | 6.83 |
| D | 1.44 | 0.27 | 0.98 | 0.89 | 3.58 |
| E | 6.27 | 1.51 | 4.02 | 4.63 | 16.4 |
| F | 0.29 | 0.35 | 3.74 | 6.89 | 11.3 |
| G | 0.10 | 0.31 | 2.75 | 4.80 | 7.96 |

(Unit: mg PSS/L-strongly acidic cation-exchange resin)

TABLE 4

Amount of PSS eluted from sample strongly acidic cation-exchange resin (x weighting factor)

| | Molecular weight | | | | |
|---|---|---|---|---|---|
| | 1,000,000 or more | 150,000 or more less than 1,000,000 | 40,000 or more less than 150,000 | 10,000 or more less than 40,000 | Sum of 10,000 or more |
| Coefficient (weighting factor) | 15 | 5.2 | 1.65 | 1.2 | — |
| Sample A | 4.50 | 0.83 | 0.74 | 0.34 | 6.41 |
| Sample B | 9.45 | 1.72 | 1.80 | 1.30 | 14.3 |
| Sample C | 54.8 | 2.50 | 2.84 | 1.18 | 61.3 |
| Sample D | 21.6 | 1.40 | 1.62 | 1.07 | 25.7 |
| Sample E | 94.1 | 7.85 | 6.63 | 5.56 | 114 |
| Sample F | 4.35 | 1.82 | 6.17 | 8.27 | 20.6 |
| Sample G | 1.50 | 1.61 | 4.54 | 5.76 | 13.4 |

Figure 2:
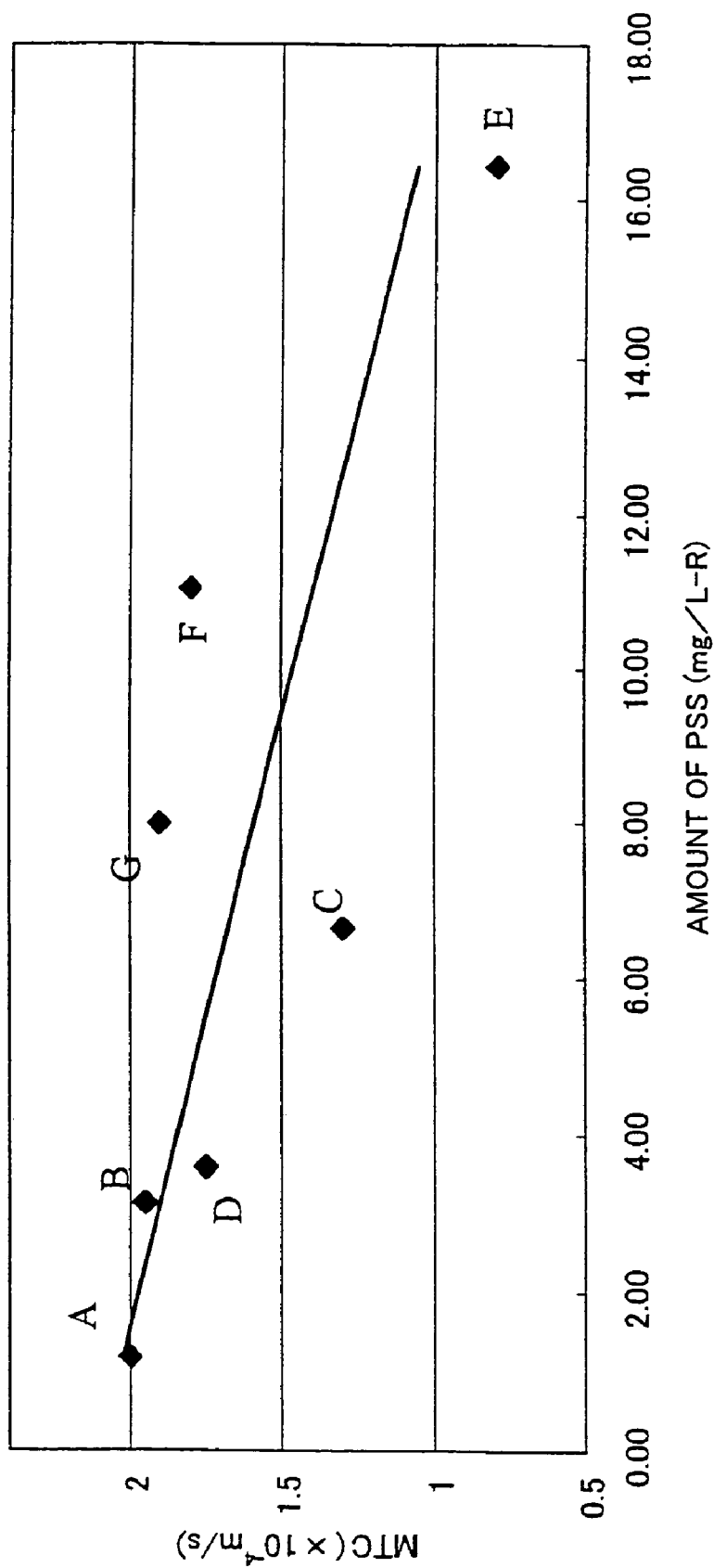
FIG. 2 is a graph showing a relationship between a sum of elution amounts of PSS (polystyrenesulfonic acid) and MTC (mass transfer coefficient) in comparative examples using the same samples as those shown in FIG. 1.

FIG. 1 shows the result plotting a relationship between the sum of the values calculated by PSS elution amount× weighting factor (converted values) and MTC (refer to Table 2) of strongly basic anion-exchange resins used together with the respective samples A to G of strongly acidic cation-exchange resins (relationship 1 between PSS elution amount and MTC). As comparison, FIG. 2 shows a relationship between the sum of elution amounts themselves of PSS having a molecular weight of 10,000 or more as listed in Table 3 and MTC (relationship 2 between PSS elution amount and MTC). In FIG. 1, as is evident from the comparison with FIG. 2, a correlation of the converted value with MTC appears destinct, and it is understood that, although it is difficult to precisely evaluate the deterioration degree of the strongly acidic cation-exchange resin only by observing the sum of PSS elution amounts, the deterioration degree can be determined and evaluated properly and very accurately by using the sum of the values using weighting factors for the respective molecular weight ranges according to the present invention. In particular, it is understood that the correlationship shown in FIG. 1 can be determined as an almost linear property independently of the structure of a resin matrix and the circumstance under which it is used (for example, term of years used), and the deterioration degree can be determined easily and accurately, and further, stably.

Figure 3:
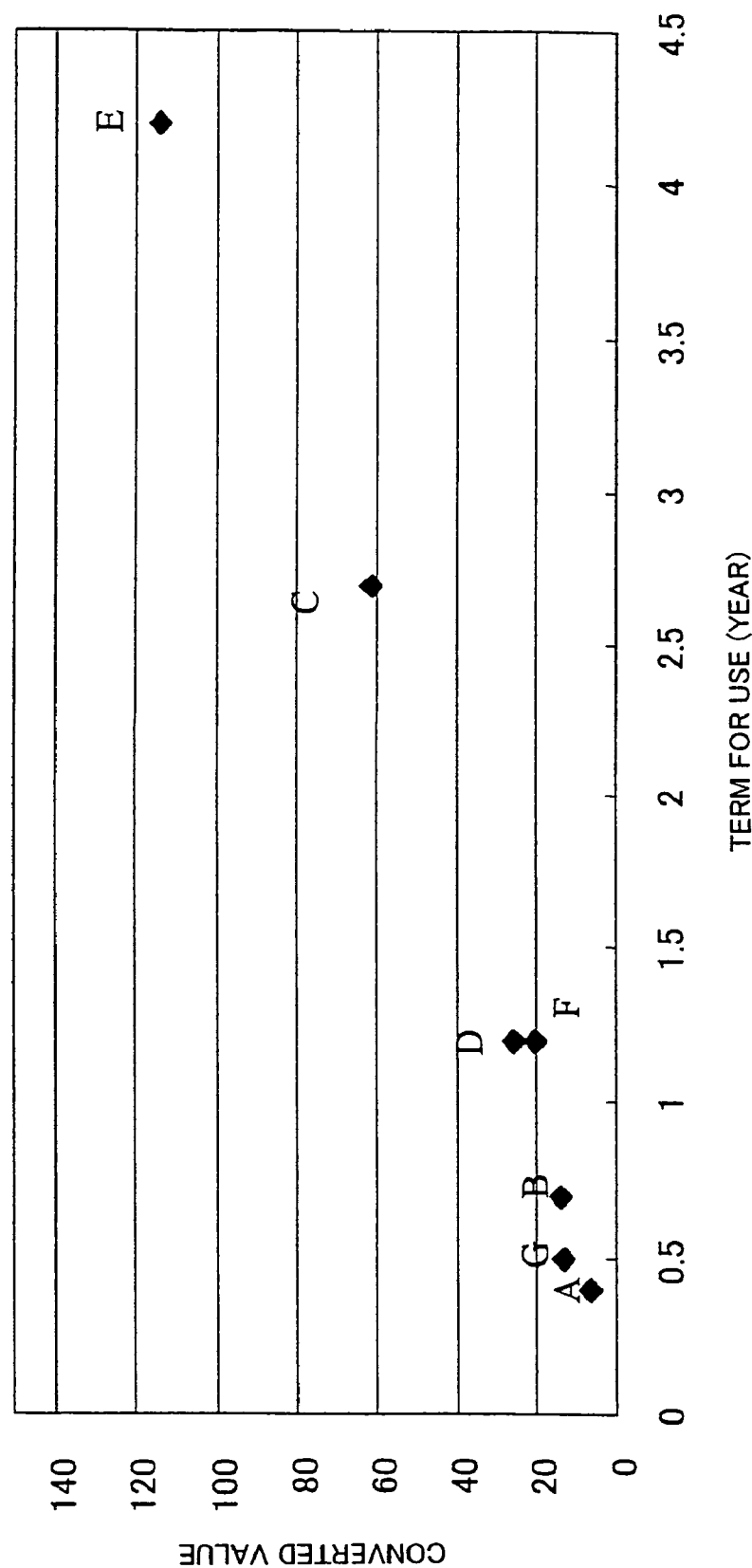
FIG. 3 is a graph showing a relationship between a term for use (year) and a converted value according to the present invention in examples of the present invention.
Figure 4:
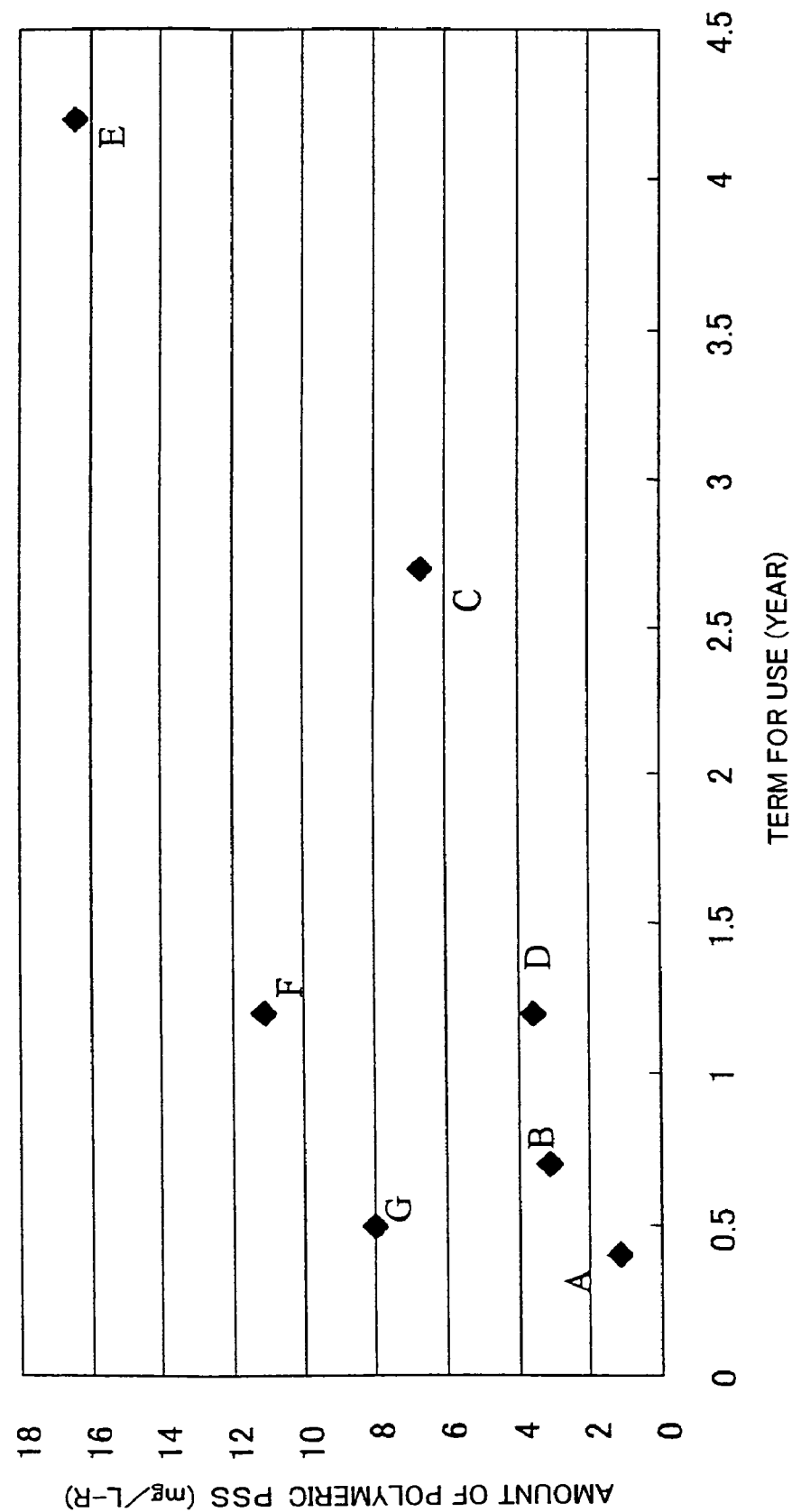
FIG. 4 is a graph showing a relationship between a term for use (year) and a sum of elution amounts of PSS in comparative examples using the same samples as those shown in FIG. 3.

Further, FIG. 3 shows a relationship between a term for use (year) of the strongly acidic cation-exchange resin and the sum of the values calculated by PSS elution amount× weighting factor (converted values). FIG. 4 shows relationships between terms for use (year) of the same sample these sample resins were resins which had been used in an actual plant without any problem and it is clear that the sample resins F and G which had not been deteriorated appreciably as viewed from the values of MTC of strongly basic anion-exchange resins used together with these strongly acidic cation-exchange resins as a pair (shown in Table 2), as shown in FIG. 4, in the conventional evaluation method based on the elution amount of PSS having a molecular weight of 10,000 or more, it is judged that the PSS elution amount is over a criterion value (usually, if the elution amount is more than 5 mg/L-R, it is determined that a deterioration tendency is apparent.) and a deterioration tendency has become apparent, and therefore, a relationship between such a judgement does not reflect the actual situation. In contrast, by using the sum of values using a weighting factor for each molecular weight range in the evaluation method according to the present invention, as is evident from FIG. 3, both samples F and G exhibit almost the same level of the sum as that in the other samples A, B and D which do not exhibit a deterioration tendency, and therefore, the performance of these sample resins F and G are regarded as good as those of the other sample resins A, B and D and these evaluation results do reflect actual operating status of these resins.

Therefore, by using the evaluation method according to the present invention, the deterioration degree of a strongly acidic cation-exchange resin can be evaluated precisely.

Further, particularly in FIG. 3, it is understood that, from the data of sample E which was obtained incidentally, an upper limit of the above-described sum of the values calculated by PSS elution amount×weighting factor may be set, for example, at about 100. As long as a strongly acidic cation-exchange resin is used under a condition of this upper limit 100 or less, it becomes possible to always use the resin within a range in which a deterioration degree does not exceed the upper limit. That is to say, replacing the resin if the upper limit has been reached or approached permits to use a strongly acidic cation-exchange resin always stably and within a safe range.

However, merely for the control so that a deterioration degree does not exceed a loosely predetermined upper limit, it is possible to achieve the control by replacing the resin always at an early stage without run a risk of malfunction, but, if done so, there is a possibility that the resin is replaced in spite of existence of a sufficient remaining possible term for use of the resin, and such replacement is not efficient from the viewpoints of operation costs. Accordingly, in a case indicating such a property as shown in FIG. 3, if a value lower than the upper limit 100, for example, about 80, is set at a criterion value for starting to prepare the replacement of the cation-exchange resin, from a time having reached this criterion value, in consideration of a term until a time approaching the upper limit, the replacement of the resin can be prepared with an enough time. This criterion value may be appropriately decided in accordance with the time required for the preparation of the resin to be replaced. Thus, by setting a criterion value for starting to prepare the replacement of a cation-exchange resin, it becomes possible to use the resin efficiently as much as possible always in the usable range of the cation-exchange resin without excess of the range, and extension of the resin exchange cycle and great reduction of the running cost can be easily achieved without any problem.

Although the present invention is suitable to be adopted for the evaluation of a strongly acidic cation-exchange resin used in a condensate demineralizer of a power plant, as long as a precise evaluation of a cation-exchange resin is required, the present invention can be applied to the control of any water treatment system.

Thus, in the method for evaluating a cation-exchange resin according to the present invention, it becomes possible to evaluate a deterioration degree of the resin precisely by a specified single determination method, independently of the structure of the resin matrix and the circumstance under which it is used. By applying this evaluation method to the evaluation of a strongly acidic cation-exchange resin used in a condensate demineralizer of a power plant, it becomes possible to stably continue a desirable operation of the condensate demineralizer and use the cation-exchange resin as effectively as possible within a possible term for use, and the replacement cycle of the resin may be maximized and the cost required for the operation may be reduced.

INDUSTRIAL APPLICATIONS OF THE INVENTION

The method for evaluating a cation-exchange resin according to the present invention can be applied to any field requiring a precise evaluation of a cation-exchange resin, and in particular, it is suitable to be applied to the evaluation of a strongly acidic cation-exchange resin used in a condensate demineralizer of a power plant. The method for controlling a water treatment system using this evaluation method according to the present invention can be applied to any field requiring a precise evaluation of a cation-exchange resin and a determination of an optimum resin replacement time and in particular, it is suitable to be applied to the evaluation of a strongly acidic cation-exchange resin used in a condensate demineralizer of a power plant and the decision of the resin replacement timing.

The invention claimed is:

1. A method for evaluating a strongly acidic cation-exchange resin wherein said strongly acidic cation-exchange resin is contacted with an aqueous eluting solution and polystyrenesulfonic acid being eluted from said resin is measured, comprising the steps of:
   setting a plurality of molecular weight ranges in a molecular weight distribution of said polystyrenesulfonic acid eluted; and
   evaluating a performance of said strongly acidic cation-exchange resin based on a relationship of each molecular weight range with an amount of said polystyrenesulfonic acid eluted in said each molecular weight range.

2. The method for evaluating a strongly acidic cation-exchange resin according to claim 1, wherein a weighting factor for indicating a deterioration degree of said performance of said strongly acidic cation-exchange resin is preset for said each molecular weight range, and said performance of said strongly acidic cation-exchange resin is evaluated by using the sum of values, each calculated by multiplying an amount of said polystyrenesulfonic acid eluted in said each molecular weight range by a corresponding weighting factor, as an index indicating said performance of said strongly acidic cation-exchange resin.

3. The method for evaluating a strongly acidic cation-exchange resin according to claim 2, wherein said weighting factor is preset for said each molecular weight range, based on a variation degree of a property of an anion-exchange resin ascribed to a polystyrenesulfonic acid eluted from said strongly acidic cation-exchange resin when said strongly acidic cation-exchange resin is used in a form of a mixed bed with said anion-exchange resin.

4. The method for evaluating a strongly acidic cation-exchange resin according to claim 3, wherein said weighting factor for said each molecular weight range is set based on a variation degree of a property of an anion-exchange resin exhibited when a representative molecular weight is set for said each molecular weight range and a standard polystyrenesulfonic acid having said representative molecular weight as a known molecular weight is adsorbed on said anion-exchange resin.

5. The method for evaluating a strongly acidic cation-exchange resin according to claim 1, wherein said plurality of molecular weight ranges are set in a range of molecular weight of 10,000 or more.

6. The method for evaluating a strongly acidic cation-exchange resin according to claim 1, wherein a copper ion and/or an iron ion are adsorbed on said strongly acidic cation-exchange resin, a hydrazine aqueous solution is contacted therewith to deteriorate said resin acceleratedly, and after said copper ion and/or said iron ion are desorbed, said aqueous eluting solution is contacted to elute said polystyrenesulfonic acid into said aqueous eluting solution.

7. The method for evaluating a strongly acidic cation-exchange resin according to claim 1, wherein an aqueous solution containing an ammonia and a hydrazine is used as said aqueous eluting solution.

8. The method for evaluating a strongly acidic cation-exchange resin according to claim 1, wherein a performance of said strongly acidic cation-exchange resin used in a condensate demineralizer of a power plant is evaluated.

9. A method for controlling a water treatment system comprising the steps of:

applying a method for evaluating a strongly acidic cation-exchange resin, wherein said strongly acidic cation-exchange resin is contacted with an aqueous eluting solution, and when polystyrenesulfonic acid being eluted from said resin is measured, a plurality of molecular weight ranges are set in a molecular weight distribution of said polystyrenesulfonic acid eluted, and a performance of said strongly acidic cation-exchange resin is evaluated based on a relationship of each molecular weight range with an amount eluted in said each molecular weight range, to an evaluation of a cation-exchange resin used in a water treatment system; and determining a timing for replacement of said strongly acidic cation-exchange resin based on the result of said evaluation.

10. The method for controlling a water treatment system according to claim 9, wherein a weighting factor for indicating a deterioration degree of said performance of said strongly acidic cation-exchange resin is preset for said each molecular weight range of said strongly acidic cation-exchange resin used in said water treatment system, and said performance of said strongly acidic cation-exchange resin is evaluated by using the sum of values, each calculated by multiplying an amount eluted in said each molecular weight range by a corresponding weighting factor, as an index indicating said performance capability of said cation-exchange resin.

11. The method for controlling a water treatment system according to claim 10, wherein an upper limit is set to said sum of values, each calculated by multiplying an amount eluted in said each molecular weight range by a corresponding weighting factor, and said cation-exchange resin is used in a range of said upper limit or less.

12. The method for controlling a water treatment system according to claim 11, wherein with respect to said sum, a criterion value, which is lower than said upper limit, is set for starting to prepare the replacement of said strongly acidic cation-exchange resin being used.

13. The method for controlling a water treatment system according to claim 9, wherein a performance of said strongly acidic cation-exchange resin used in a condensate demineralizer of a power plant is evaluated, and based on the result of the evaluation, a timing for replacement of said cation-exchange resin is determined.

* * * * *